United States Patent [19]
Feuerstein et al.

[11] Patent Number: 6,141,565
[45] Date of Patent: Oct. 31, 2000

[54] DYNAMIC MOBILE PARAMETER OPTIMIZATION

[75] Inventors: Martin J. Feuerstein, Redmond; Thomas R. Crawford, Bellevue, both of Wash.

[73] Assignee: Metawave Communications Corporation, Redmond, Wash.

[21] Appl. No.: 08/970,704

[22] Filed: Nov. 13, 1997

[51] Int. Cl.[7] .................................................. H04Q 7/20
[52] U.S. Cl. ........................ 455/560; 455/422; 455/423
[58] Field of Search .................................. 455/67.1, 403, 455/422, 423, 424, 425, 453, 524, 560, 561, 562; 370/230, 232, 234, 329, 341, 349, 468

[56] References Cited

U.S. PATENT DOCUMENTS

| | | | |
|---|---|---|---|
| 5,023,900 | 6/1991 | Tayloe et al. | 455/424 |
| 5,095,500 | 3/1992 | Tayloe et al. | 455/424 |
| 5,521,958 | 5/1996 | Selig et al. | 455/423 |
| 5,633,859 | 5/1997 | Jain et al. | 370/234 |
| 5,673,259 | 9/1997 | Quick, Jr. | 370/342 |
| 5,701,295 | 12/1997 | Bales et al. | 370/271 |
| 5,845,209 | 12/1998 | Iwata | 455/67.1 |

*Primary Examiner*—Nay Maung
*Attorney, Agent, or Firm*—Fulbright & Jaworski L.L.P.

[57] ABSTRACT

Systems and methods for continuously providing network parameters to various network elements in a cellular PCs or other wireless communication network in order to optimize operation of the network are disclosed. According to one embodiment, network parameters are provided based on predicted or historical network conditions. In another embodiment, network parameters are provided based on monitored network conditions. A database of network parameters optimized for particular network conditions is provided which may be updated with parameters optimized in real-time.

68 Claims, 2 Drawing Sheets

DYNAMIC MOBILE PARAMETER OPTIMIZATION

REFERENCE TO RELATED APPLICATIONS

Reference is hereby made to the following co-pending, commonly assigned, U.S. patent application Ser. No. 08/582,525, entitled "Method and Apparatus for Improved Control Over Cellular Systems"; Ser. No. 08/651,981, entitled "System and Method for Cellular Beam Spectrum Management"; Ser. No. 08/808,304, entitled "Conical Omni-Directional Coverage Multibeam Antenna with Multiple Feed Network"; Ser. No. 08/924,285, entitled "Antenna Deployment Sector Cell Shaping System and Method"; Ser. No. 08/782,051, entitled "Pivotal Antenna System and Method"; and Ser. No. 08/892,946, entitled "System and Method for 911 Cellular Location Determination"; the disclosures of which are incorporated herein by reference.

TECHNICAL FIELD OF THE INVENTION

This invention relates to a cellular network utilizing network parameters to control communication throughout the network and more particularly to optimization of network parameters based on dynamic communication and network conditions such as traffic load and balancing conditions and/or changing interference conditions.

BACKGROUND OF THE INVENTION

Because of the mobility of communication units operating within a cellular system, information with respect to the operation of the mobile unit within the communication network must be established. Often this information, in the form of network parameters, is communicated to the mobile unit in a forward control channel in order to allow the mobile unit to adjust its operation. For example, a mobile unit may be provided network parameters for a particular communication network when establishing communication with a network in order to adjust the mobile unit's operation to coincide with that of the network.

Typically, network parameters include network wide parameters such as communication thresholds, e.g., a threshold at which a signal strength handoff might be requested. Likewise, the network parameters include network timing information, such as search windows. Additionally, network parameters may include information localized to a particular portion of the communication network. Such localized network parameters include individual cell, sector or beam traffic density, or related capacity parameters, and neighboring cell lists, or where multi-sectored or multibeam cells are used antenna sector/beam lists, in order to allow a mobile unit operating within a particular area to scan or monitor signals from nearby base sites.

The current state of the art in cellular networks is to fix the network parameters at the time the network is deployed. Accordingly, the network parameters selected are adjusted to achieve an acceptable compromise between conditions from all the varying traffic conditions that may be experienced in the network. As such, the selection of parameters involve trade offs in performance and are not optimized for each geographic area or every given time of day or traffic loading condition that may exist. This yields a static type network plan and network optimization, which does not take into account varying traffic conditions and varying interference conditions that the network will be subject to on a daily or hourly basis.

Cellular networks are subject to highly time variable traffic loads. In particular, the performance of code division multiple access (CDMA) networks, where all users share the same frequency, is very sensitive to the traffic density as a function of geographic location as well as the amount of interference that is present in the network. Accordingly, system operators typically notice increases in the drop call rate in specific locations, or network performance problems in specific locations, as the traffic flow changes based on time of day, day of the week, or specific traffic hot spots ancillary to sporting events or traffic jams, for example. Therefore, the localized traffic handling ability of the network should change based on how the users are distributed.

However, during the life span of the network, parameters are changed relatively infrequently, certainly not in a real-time or dynamic basis as the traffic patterns or interference patterns change. Therefore, there exists a need in the art for a system and method of dynamically adjusting network parameters.

A need also exists in the art for a system and method for adjusting network parameters for a particular portion of the network based on localized conditions. A further need exists in the art for adjusting network parameters based on any desired scale, such as network wide or particular portions of the network, cells, sectors, beams or mobiles.

SUMMARY OF THE INVENTION

These and other objects, features and technical advantages are achieved by a system and method which coordinates the changing of parameters in the network based on conditions as measured throughout the network such as at various cell sites in the network. For example, a cluster of cell sites may be utilized in measuring local interference and/or local traffic load conditions in order to make estimates of optimum sector orientations and sector beam lists to provide load balancing of the traffic and reduction of the network parameters and/or the interference on a network wide basis.

This local loading and interference condition information is preferably routed to a network monitoring or network operations center that provides communications among the various sites of a network. Accordingly, globally optimum decisions, such as mapping of beams to sectors or how to configure the cell sites to best handle the traffic in a given area, may be made. The network operation center would then have protocols that would select optimum sets of parameters to be sent to the cell sites and/or the mobiles, such as hand off thresholds, neighbor lists, and search windows, so that the mobiles in the network are able to adapt to the varying conditions in the network.

Accordingly, if traffic density distribution, i.e., a hot spot of network traffic within a portion or portions of the network, requires that the network itself, such as by the orientation of the sectors being changed in a particular configuration, the cell sites and/or the mobiles operating therein are updated with the information that they need to operate in the new network configuration. Therefore, not only does the network adapt and mold itself to the traffic conditions, but the mobiles themselves are given information that allows them to adapt to the network as well.

Information provided to network systems, such as a base transcriber station or call site, in order to optimize the system may include such information as transmit power to utilize for a particular beam, sector or cell. Likewise, the information may adjust a cell site's receive sensitivity for a particular beam, sector or cell. Other power control parameters such as thresholds, target settings, operating ranges and the like may be optimized or adjusted by the information provided to the network systems. Additionally, information with respect to grade of service (GOS), metrics, i.e., bit error rate (BER), frame error rate (FER), voice quality measurements, data throughput, packet success probabilities, dropped call rates, call origination and/or termination success rates, or the like, may be provided to the network systems.

Information provided to the mobiles in order to optimize the system may include such information as identification of particular beams or signals, associated with particular base stations, to monitor or transmit in order for the mobile to determine the appropriate resources to utilize in a handoff situation. Likewise, the information may adjust a mobile's threshold settings, such as a threshold at which the mobile requests a handoff. Similarly, a search window may be adjusted so as to minimize the effect of interfering signals due to traffic loading.

According to the present invention the control of network parameters may be based on a number of potential inputs or conditions. In one embodiment, network parameters are pre-programmed changes based on time of day, day of week, and/or historical information with respect to communication traffic changes. For example, network parameters may be preprogrammed changes based on loading conditions, such as a number of mobiles historically serviced in a particular area. In an alternative embodiment, network parameters are adjusted on a more real-time basis. In this embodiment, measurements at various points in the network, such as at particular cell sites or from probe or drone mobiles in the network, gauging interference and traffic load on a real-time basis, drive the optimization control. The monitored or measured communication attributes utilized in parameter selection or optimization according to the present invention may include signal levels, bit error rates, frame error rates, voice quality measurements, data throughput, packet success probabilities, dropped call rates, call origination and/or termination success rates, and the like.

Preferably, the network parameters of the present invention are provided from a knowledge base of parameters, such as a database of related network parameters. Accordingly, during network operation, such as at particular times of day or based on monitored communication conditions, the network operation center, or particular cell site, utilizes the database to look-up optimum sets of parameters to be sent to the cells and mobiles, or other network elements, for their use. Such a database or look-up tables are advantageous as there are various different parameter sets, the selection of which depend upon different inputs or combinations of inputs, which may be downloaded to the mobiles, base transcriber stations or other network elements. With the selection and downloading of a parameter set, the network elements, including cell sites and mobiles are dynamically changed depending upon various pre-calculated responses to different types of network parameters.

In a preferred embodiment, the database or look-up table is updated in real-time as changes to the network are made. Such updates may be based on real-time or delayed measurements such as the traffic load or the interference levels on the network. As such, the database of network parameters preferably includes various permutations corresponding to special events, for example, vehicular traffic jams that reoccur at particular locations, sporting events, and other vehicular or user traffic anomalies that cause predictable or surmisable changes in the communication traffic patterns in the cellular network. The database or look-up table, including such updates, is referenced so that, at any given time, the status of the network is taken into account and the best setup parameters are always sent to network elements in various parts of the network.

Additionally, where a modeling tool is used, such as a network simulation tool based on a computer software representation of network elements, database updates may be accomplished based on real-time optimization paradigms. Accordingly, the simulation tool may be used to calculate optimum parameters to be sent to the network elements and, thus, updates of the database or look-up table include these determined optimum parameters.

Another aspect of the optimization of the network parameters is preferably based on the actual directional flow, i.e., movement, velocity, and/or directional vectors, of the communication traffic as measured. For example, network parameters may be adjusted based on mobile traffic patterns associated with commuting and particular directions of vehicular traffic flow from historical data, or from measurements that are made in the network of handoff activity. Accordingly, network loading predictions may be made, and thus network parameters selected, based on the knowledge that at a particular time there is a predominance of flow in a particular direction or particular sequence of handoffs that is occurring more often. Therefore, cells may be sent sector, beam and other parameters, and mobiles may be sent neighbor lists, handoff thresholds, or search windows that make a particular set of handoffs or sequence of handoffs or particular direction of travel optimum from a network performance point of view or from a traffic load distribution point of view.

In another alternative embodiment of the present invention, localization of the network parameters sent to the network elements is based on geographical information with respect to a mobile or mobiles determined from a position location system. The position location system may be tied into the cellular network, such as through the use of multiple base stations to triangulate the mobile's position. However, according to the present invention, the localization may be accomplished to an angular extent based on a multiple beam antenna system able to differentiate mobiles according to which beams the mobiles are operating in. Such an angular location system may also coordinate among cell sites to make a position estimate or to provide information relevant to the selection of network parameters based on which combination of beams the mobile's signals appear strongest in at various cell sites. Accordingly, particular local variations in network performance can be accommodated in handoff, thresholds, drop timers and other parameters that could be customized to reduce dropped calls and increase the voice quality for users.

In a preferred embodiment of the present invention, in addition to sending custom network parameters to the network elements, the system operates to send custom messages to the mobile, such as a digital message triggering a desired action from the mobile or a recorded message played for the mobile user and/or for the land line user that is in contact with the mobile based on measurements of the network. For example, a cell that is overloaded with communication traffic may send a message to mobiles in a particular sector that is being affected, such that the quality is going to be impaired for some period of time, i.e., the GOS for these mobiles will be degraded, or users in particular unfavorable radio propagation conditions may have messages forwarded to the land line connection indicating that the mobile is experiencing network troubles, and that the mobile will be under good quality conditions in some period of time.

It shall be appreciated that a technical advantage of the present invention is that network parameters are adjusted dynamically to optimize communications within the network as utilization and loading of the network change. A further technical advantage of the present invention is realized in the ability to adjust the network parameters based on such considerations as predetermined criteria, such as a time of day or other attribute, in addition to the ability to select and/or adjust the network parameters for real-time optimization of the network based on monitored conditions.

Another technical advantage of the present invention is that the network parameters for a particular portion of the network, as communicated to the various network elements including the cell sites and the mobiles operating therein, are based on localized conditions. Accordingly, the operation of the network elements may be optimized for particular localized conditions, including loading, geography, and communication conditions. Moreover, optimization of particular network parameters may be on any scale according to the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
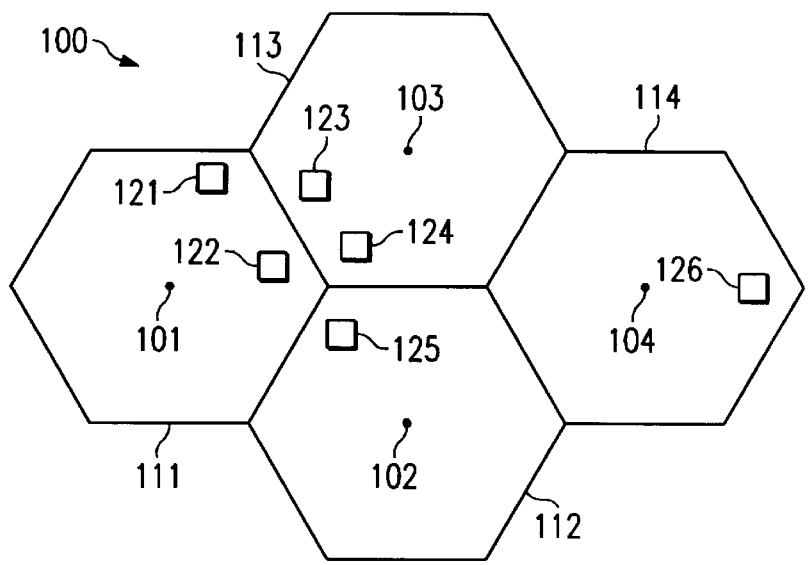
FIG. 1 illustrates a portion of a cellular network system having mobile communication units unevenly distributed therein.

Directing attention to FIG. 1, a portion of a cellular network, network portion 100, is illustrated. Shown are base transceiver stations (BTS) 101 through 104 having predetermined areas of primary influence illustrated as cells 111 through 114 respectively. It shall be appreciated that, although not shown in the drawing of FIG. 1, the base stations of a preferred embodiment of the present invention can vary their areas of influence substantially from the boundaries shown through adjustment of parameters such as the network parameters taught herein. Operating within the various cells of network portion 100 are mobile units 121 through 126. It shall be appreciated that mobile units 121 through 126 may be any combination of cellular wireless devices in communication with the BTSs of the cellular network.

It shall be appreciated that the distribution of mobile users within the illustrated cellular network portion is uneven, i.e., there is a concentration of mobile units near the intersections of cells 111, 112 and 113. Such a loading pattern might be experienced, for example, where a major thoroughfare is disposed between BTS 101 and BTSs 102 and 103. Likewise, the illustrated loading pattern is illustrative of that which may be experienced where a place of congregation, such as a sporting arena or high-rise office tower, is disposed near the intersections of cells 111, 112 and 113.

In a typical prior art cellular network, network parameters such as thresholds and search windows would be selected network wide, such as at network deployment, and downloaded or implemented in each of the base stations and mobiles operating therein. Accordingly, in a typical prior art system, each of mobile units 121 through 126 would receive transmission of the same values for these network parameters, regardless of the then existing operating conditions of the network.

A problem exists in the use of these system wide network parameters as can be seen through reference to the loading pattern illustrated in FIG. 1. Clearly, mobiles operating in the more congested regions, such as mobile units 122 and 124, are likely to experience more interference from coexisting mobile units (it shall be appreciated that although a typical cellular network is designed to service a significant number of mobile units, the effects of utilization of the illustrated network by only a few mobiles is assumed to be significant in order to simplify the concepts discussed). However, if a network parameter, such as a signal to interference ratio threshold at which to request a handoff, selected so as to provide adequate characteristics system wide is provided to mobile unit 122, this parameter may be arbitrarily low with respect to the conditions experienced by this particular mobile unit. Likewise, this parameter may be arbitrarily high with respect to mobile unit 126 operating without significant interference from other mobiles. For example, this system wide threshold may cause mobile unit 126 not to request a handoff when highly localized interference is experienced, such as from a nearby non-network source, when a handoff to another available sector or cell would improve signal quality.

Typically, network parameters are selected so as to provide an acceptable quality of communications, considering the communication conditions expected to exist system wide (i.e., "average system conditions"), without causing undesired system behavior, such as triggering repeated handoff requests. Such network parameters may be acceptable for the operation of a mobile located so as to actually experience average or near average system conditions, i.e., no unusual loading or interference.

In contrast, as already discussed, mobile unit 122 is likely to experience atypical interference because of the particular loading pattern. Accordingly, a network wide parameter, such as the aforementioned signal to interference threshold, may cause mobile unit 122 to request a handoff to another sector or cell in an effort to establish better quality communications. However, due to the loading of the network in the areas around mobile unit 122, such a handoff is unlikely to improve the quality of the communications experienced. Accordingly, the use of such an arbitrarily low network wide threshold may cause mobile unit 122 to again request a handoff, causing undesired overhead operations in the network.

According to the present invention, the network parameters provided to the various network elements are optimized for conditions experienced in the network. Accordingly, a signal to noise threshold for requesting a handoff for mobile unit 122, for example, as well as other mobiles in the congested region, is optimized so as to provide acceptable communications without causing undesired system behavior. Likewise, the base station receiving the signal of mobile unit 122 may receive an optimized parameter such as a gain adjustment for a particular antenna beam or sector on which the mobile unit's signal is being received.

Of course, the adjusting of network parameters as described above may result in communication quality at particular mobile units, such as mobile unit 122, temporarily being less than the quality experienced at other mobile units, such as mobile unit 126. Accordingly, a preferred embodiment of the present invention provides for messages to the parties of the call in order to inform them of the temporary communication degradation. Such messages may be provided simultaneously with the selection of particular network parameters or may be provided on the occurrence of an event, such as the reaching of a monitored threshold.

Figure 2:
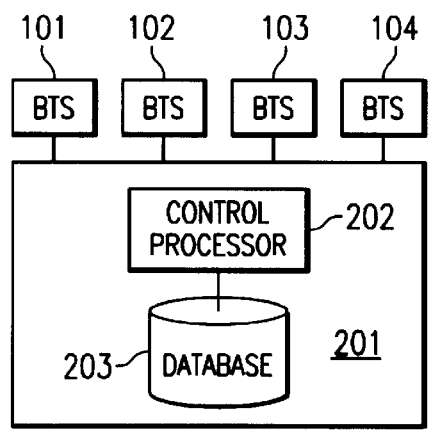
FIG. 2 illustrates a block diagram of a preferred embodiment of the present invention.

Directing attention to FIG. 2, a high level block diagram of a preferred embodiment of the present invention is shown. Illustrated is network control system 201 coupled to the BTSs of the network, shown here as BTSs 101 through 104 of FIG. 1. Network control system 201 may be a discrete control apparatus, as illustrated, or may be integrated within existing cellular network systems or elements, such as base station controllers (BSC) or mobile switching offices (MSO). Of course, where network control system 201 is discrete from the network BSCs and MSOs and other network elements, communication may be provided therebetween in order to monitor network conditions and/or provide network parameters to optimize the operation of these network elements. Additionally, network control system 201 may be adapted to provide or utilize functionality, complementary to that described herein. For example, a cellular network call management system/method which may be deployed in conjunction with the present invention is described in the above referenced U.S. patent application entitled "Method and Apparatus for Improved Control Over Cellular Systems." Likewise, a cellular beam management system/method which may be deployed in conjunction with the present invention is described in the above referenced U.S. patent application entitled "System and Method for Cellular Beam Spectrum Management."

Network control system 201 preferably includes control processor 202 coupled to database 203. It shall be appreciated that control processor 202 may be any computer system, such as a general purpose computer system, having sufficient resources, including a central processor and associated memory, in order to provide optimization of network parameters according to the present invention. Likewise, database 203 may be any form of apparatus suitable for providing storage of the knowledge base of network parameters and other information, such as the aforementioned messages, according to the present invention.

According to the present invention, database 203 stores various sets of network parameters. Each such set of network parameters is optimized so as to result in desired system behavior when particular communication conditions are determined to exist. Accordingly, control processor 202 determines a present or predicted state of the cellular network and selects a particular set of network parameters to provide optimized performance with respect to the particular communication conditions. However, where network parameters are not available which are optimized for particular communication conditions, or where it is otherwise determined advantageous, parameters may be generated, i.e., calculated, which are optimized based on network theory or equations representing network operation.

It shall be appreciated that network control system 201 is in communication with each of the base transceiver stations. Therefore, the network parameters transmitted to each of the network elements may be optimized for the particular area in which the particular elements are operating. Accordingly, network parameters optimized to provide acceptable communications in the loading distribution illustrated in FIG. 1 and discussed above may be provided.

It shall be appreciated that, according to a preferred embodiment of the present invention, the optimized network parameters may be provided to any combination of network elements including mobile units and base stations. For example, network parameters adjusted at a base station according to the present invention may include transmit power or receive sensitivity with respect to the cell, or a sector or beam, power control parameters, such as thresholds, target settings, and operating ranges, and GOS metrics, such as BER, FER, voice quality, data throughput, packet success probabilities, dropped call rates, and call origination or termination success rates. Additionally, the network parameters adjusted at the base station may include sector orientation/rotation, sector or beam outboard reach, through attenuation or gain adjustment and/or antenna downtilt/uptilt. Systems and methods providing adjustable sector orientation and sizing suitable for use with the present invention are taught in the above-referenced U.S. patent application entitled "Antenna Deployment Sector Cell Shaping System and Method." Likewise, systems and methods providing for the adjustable downtilt of antennas suitable for use with the present invention are taught in the above-referenced U.S. patent application entitled "Pivotal Antenna System and Method." Network parameters adjusted at the mobiles may include, for example, particular beams or signals to monitor and/or transmit upon, thresholds, and search windows.

The GOS related metrics allow service providers to degrade service quality, such as in high traffic areas, to support more users or otherwise adjust capacity. Accordingly, changes to GOS metrics allow the capacity of the network, or portions thereof, to softly degrade as a function of traffic load, as opposed to a hard or fixed limit on the capacity.

It shall be appreciated that adjustment of certain ones of the network parameters at a particular network element may advantageously be accompanied by a complementary adjustment at another network element. For example, where GOS metrics are adjusted at a base station, complementary network parameters may be adjusted, such as a handoff threshold, at a mobile unit communicating therewith. Of course, optimization of network parameters according to the present invention may involve only a single network element, if desired.

Figure 3:
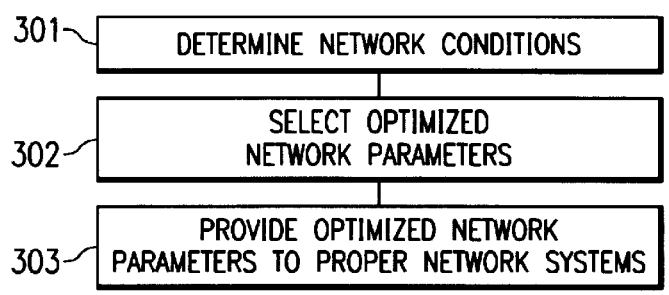
FIG. 3 illustrates a flow diagram of operation of a preferred embodiment of the present invention.

Directing attention to FIG. 3, a flow diagram of the operation of network control system 201 is illustrated. It shall be appreciated that an apparatus for accomplishing the illustrated flow diagram may be embodied in a computer program operable on control processor 202.

At box 301, network control system 201 determines network conditions. Such conditions may be determined through monitoring selected network attributes, such as signal levels, bit error rates, frame error rates, voice quality measurements, data throughput, packet success probabilities, dropped call rates, call origination and/or termination success rates, or the like. The network attributes may be provided by the coupled BTSs or other network elements, i.e., reported by mobile units, or may be predicted through the use of historical information. Predictions of network conditions may be based on a particular time of day, day of week, or the like. Accordingly, control processor 202 of network control system 201 may include inputs for real-time monitoring of selected network attributes, in order to determine network conditions. Likewise, control processor 202 may make determinations based on non-real-time information, such as preestablished time of day configurations or historical information as might be compiled from monitoring of selected network attributes or from calculation from network models.

It shall be understood that monitoring of network attributes according to the present invention may be accomplished by the network control system in a number of ways. For example, the network control system may be apprised of various network conditions through connections between network control system 201 and the BTSs illustrated. Of course, such network conditions may be provided by connections to other network elements, such as the aforementioned BSCs or MSOs or even mobile units operating within the network.

Mobile condition information may provide communication attributes as experienced by the mobiles in order that the network control system may have a more robust picture of the conditions within the network when providing network parameters. Such mobile condition information may be provided periodically by the mobile units, or it may be provided in response to a prompt from the network control system or other network element. Moreover, drone mobile units may be deployed at strategic locations throughout the network in order to periodically provide communication condition information to the network control system.

At box 302, network control system 201 selects optimized network parameters as a function of the network conditions determined at box 301. Preferably, the optimized network parameters are selected from various sets of network parameters stored in database 203. The use of stored sets of network parameters is advantageous in that system performance may be maintained through the retrieval of appropriate ones of preestablished optimized parameter sets rather than the on-the-fly optimization of the various network parameters. Of course, the present invention may operate to optimize the network parameter sets in real-time as will be discussed hereinbelow.

Preferably the sets of network parameters stored in database 203 include information identifying the network conditions under which the particular set of network parameters are to be utilized. Accordingly, when a particular network condition is determined in step 301, a proper set of network parameters may easily be selected at step 302. It shall be appreciated that network condition information stored in relation to the network parameter sets may be such information as a particular time at which the network parameter set should be utilized. Likewise, the network condition information may include information such as a particular monitored communication attribute, or attributes, for which the particular network parameter set is optimized.

Additionally, a preferred embodiment of database 203 includes information with respect to messages associated with particular network parameters for transmission to mobile units or land lines. Accordingly, a message informing the parties to the call that particular conditions may be experienced and may be played.

Furthermore, it is also preferred that the sets of network parameters stored in database 203 include information identifying the particular network element or elements to which the network parameters of the set pertain. Such network element information may include, for example, a particular BTS, sector, or beam, through which the related network parameters should be communicated to mobile units or for which each of the parameters are intended. Accordingly, the network parameters may be optimized for conditions experienced in highly localized regions of the network.

For example, by analyzing conditions experienced within the network, network control system 201 may provide network parameters selected to optimize the network based on such information as the actual directional flow, i.e., movement, velocity, and/or directional vectors, of the communication traffic as measured. Here control processor 202 may operate to analyze particular patterns, such as may be determined from network handoff activity in particular cells or sectors, and select network parameter sets based on vehicular traffic patterns associated with rush hour and particular directions of vehicular traffic flow as may be indicated in the network condition information of database 203. Therefore, network loading predictions are made, and thus network parameters selected, based on the knowledge that at a particular time there is a predominance of flow in a particular direction or particular sequence of handoffs that is occurring more often.

Accordingly, network parameter sets may be selected, including beam attributes, particular neighbor lists, handoff thresholds, and/or search windows, that make a particular set of handoffs or sequence of handoffs or particular direction of travel optimum from a network performance point of view or from a traffic load distribution point of view. These optimized network parameter sets may be optimized for network control as provided by a cellular network call management system, such as described in the above referenced U.S. patent application entitled "Method and Apparatus for Improved Control Over Cellular Systems," or a cellular beam management system, such as described in the above referenced U.S. patent application entitled "System and Method for Cellular Beam Spectrum Management," deployed in conjunction with the present invention. Accordingly, the network parameters may be utilized not only by the mobile units, but also by the aforementioned control systems.

Additionally, or alternatively, selection of the network parameter sets is based on geographical information with respect to the particular mobiles, as may be determined from a position location system. The position location system may be tied into the cellular network, such as through the use of multiple BTSs to triangulate the mobile's position. Alternatively, localization may be accomplished to an angular extent from a multiple beam antenna system able to differentiate mobiles based on which beams the mobiles are operating in. Systems and methods for the determination of a mobile's position suitable for use according to the present invention are taught in the above referenced U.S. patent application entitled "System and Method for 911 Cellular Location Determination."

Utilizing the above mentioned mobile unit location information, network parameters optimized for a particular mobile unit's position within the network are used. Accordingly, particular local variations in network performance, due to such causes as terrain irregularities, multi-path fading, near/far problems, and the like, can be accommodated in handoff thresholds, drop timers and other parameters customized to reduce dropped calls and increase the voice quality for users.

It shall be appreciated that optimized network parameters associated with particular locations from which mobile units may be operated, may be mapped through the use of the aforementioned probe mobile units, or the like, in order to preestablish entries in database 203 with respect to those locations. Mapping of network parameters may be limited to only those locations where the associated communication conditions are such that unique network parameters are desired. Of course, for locations where mapping has not been done, or in systems not utilizing network parameter mapping, the optimized network parameters may be determined on-the-fly as is discussed hereinbelow.

Referring still to FIG. 3, at box 303 network system controller 201 provides the above described optimized network parameters to the proper network elements. It shall be appreciated that different network parameters may be provided to different network elements as conditions require. For example, it is expected that optimized network parameters, such as thresholds and sector or beam assignments, will be provided by the present invention to systems or network elements, such as the base transceiver stations for their use in optimizing network communications, while complementary, and possibly, different, network parameters are provided to other network elements operable therewith. Accordingly, the network elements are dynamically adjusted to provide operation as desired.

It shall be appreciated that the above described stored network parameter sets may be utilized by the network system controller in the traffic loading example discussed in reference to FIG. 1. For example, where the congestion of mobile units 121 through 125 is due to predictable usage patterns, such as rush hour vehicle traffic on a thoroughfare, time of day network condition information in combination with network element information identifying cells 110, 112 and 113 may be utilized by network system controller 201 to select network parameters optimized for network conditions caused by the concentration of vehicular traffic and make adjustments to only those network elements affected.

Similarly, monitoring of particular attributes, such as loading at particular cell sites or communication conditions experienced by particular network elements, may be utilized by network system controller 201 to select network parameters optimized for the network conditions and their provision to only those network elements affected. Moreover, through the use of mobile unit location or quality specific information, network parameters may be selected for a conditions experienced by a particular mobile unit, such as a reduced signal due to passing under a viaduct or behind a building.

The optimized network parameter sets of the present invention may be initially provided in a number of ways. For example, network parameters optimized for expected conditions, such as times of day, interference levels, signal strengths, expected loading conditions, or the like, may be stored in database 203 upon deployment of the network. Thereafter, these network parameters may be updated as the network is modified, such as through the addition of cells or the overlaying of microcells. Additionally, the aforementioned mapping of network parameters for particular locations may be accomplished at deployment and updated thereafter as conditions require, such as with the erection of buildings within the coverage area of the network.

However, in a preferred embodiment of the present invention, optimization of network parameters is accomplished in real-time or near real-time. For example, updates to database 203 may be based on real-time measurements of the traffic load or the interference levels on the network. Accordingly, the database of network parameters includes various permutations corresponding to events experienced in the network. Such a system provides a knowledge base which is constantly updated to meet the conditions actually experienced in operation. It shall be appreciated that the storage of network parameters optimized for particular events experienced is desirable as optimizing such parameters may require considerable processor time. Thus, storage of such information, along with the associated network condition information as discussed above, provides for subsequent adjustment without burdening the system with the operations necessary to actually optimize the parameters.

Optimization of the network parameters may be accomplished through the use of a knowledge base providing communication goals, such as particular ranges of operation conditions sought, in addition to operating conditions affected by an adjustment to a particular network parameter. Utilizing this information, control processor 202 may determine optimum network parameters for particular network elements for then existing monitored conditions. These optimized parameters may then be communicated to the proper network elements as well as stored in database 203 for later retrieval when similar conditions are again monitored. Conditions may again be monitored after provision of the optimized parameters to the network elements in order to determine if the communication goals have been realized or if additional optimization is required.

In a preferred embodiment, control processor 202 includes network simulation software in order to provide network modeling. Utilizing such a modeling tool, providing simulation of network conditions upon adjustment of various network parameters, optimization of network parameters, and the associated database updates, may be accomplished based on real-time optimization paradigms which take into consideration not only conditions throughout the network, but also cascading effects caused by adjusting network parameters at particular network elements. Accordingly, network operation simulation is desirable for use in calculating the optimum network parameters according to the present invention.

Figure 4:
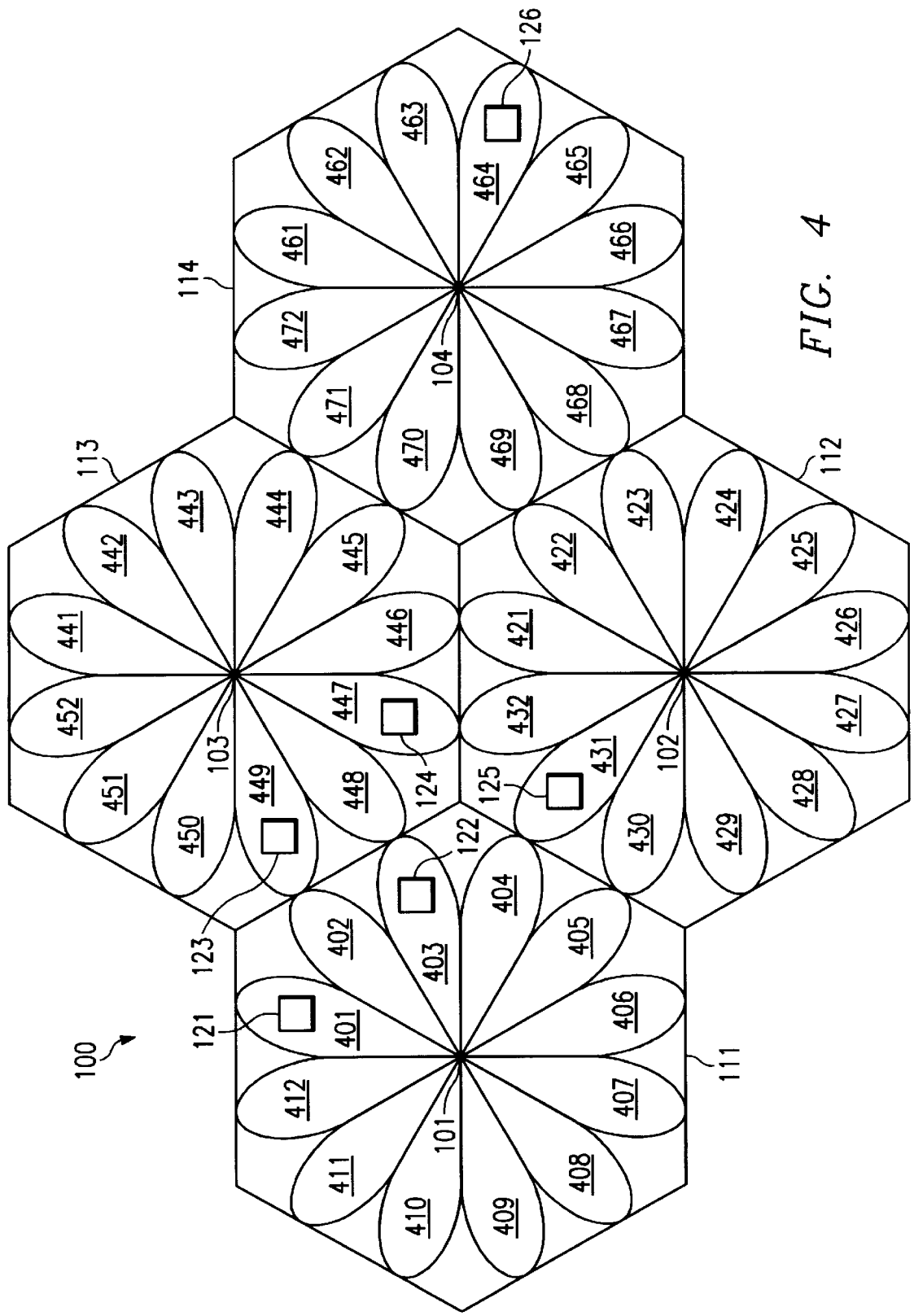
FIG. 4 illustrates the use of multibeam cells according to the present invention.

It shall be appreciated that use of the present invention in networks having multi-sectored or multibeam cells is advantageous. Directing attention to FIG. 4, network portion 100 of FIG. 1 is shown having multibeam radiation patterns such as may be produced utilizing a multibeam antenna system, such as is described in the above referenced U.S. patent application entitled "Conical Omni-Directional Coverage Multibeam Antenna with Multiple Feed Network." Specifically, cells 111, 112, 113, and 114 include antenna beams 401–412, 421–432, 441–452, and 461–472 respectively, Here mobile units 121 through 126 are shown operating within roughly the same positions as illustrated in FIG. 1, however, it shall be appreciated that the mobile units are operating within a particular narrow beam of the multibeam cells, i.e., mobile unit 121 is operating within beam 401 of cell 111. Accordingly, network parameters may be optimized for communications being conducted in each narrow beam and, thus, localized for a small region within the network.

Of course, network parameters may be optimized for each of the individual mobile units according to the present invention, such as through monitoring particular communications conditions with respect to the mobile unit. As discussed above, monitoring the position of a mobile may indicate its proximity to physical structure which may dictate the use of a particular set of network parameters.

However, it shall be appreciated that particular network parameters may be better suited to large scale optimization, i.e., not based on the mobile units themselves. For example, neighbor lists provided to a mobile unit in order to allow scanning particular neighboring cells, sectors, or beams for handoff purposes may advantageously be optimized for each beam. A neighboring list of beams provided to a mobile, such as mobile unit 122, operating within beam 403 of cell 111 may generally be provided information to monitor signals associated with a predetermined number of the most adjacent beams, such as beams 402, 404, 448, and 449, as network parameters. However, due to loading or other monitored conditions, the present invention may determine that a particular beam of the neighbor list, such as beam 449 shown serving mobile unit 123, is less desirable for system optimization purposes and thus remove the beam from the list. During the particular monitored condition, the present invention may therefore dynamically alter the neighbor list, through selection of the appropriate network parameter set, to include a substitute beam such that the optimized parameter neighbor list includes beams 402, 404, 447, and 448. It shall be appreciated that the condition making it less desirable to include beam 449 in the neighbor list may exist for any mobiles operating in beam 403 and, therefore, optimization of this network parameter based on a particular beam or beams which may be effected by the condition monitored at beam 449, rather than individual mobiles, is advantageous.

Additionally, it shall be appreciated that optimization of network parameters may be on any scale. As shown above, certain parameters may be optimized for particular mobiles and/or particular beams. Additionally, it should be understood that network parameters may also be optimized for particular cells, network portions, or any other scale deemed appropriate.

Although the present invention and its advantages have been described in detail, it should be understood that various changes, substitutions and alterations can be made herein without departing from the spirit and scope of the invention as defined by the appended claims.

What is claimed is:

1. A system for dynamically providing wireless communication network parameters to network elements wherein the network parameters provided are optimized with respect to particular network conditions, said system comprising:

means for determining a network condition;

means for selecting a network parameter optimized with respect to said determined network condition, wherein said selecting means comprises means for retrievably storing a plurality of network parameters optimized for various communication conditions in said wireless communication network, wherein ones of said stored network parameters are identified with particular ones of said communication conditions, and wherein identification of said stored network parameters with said particular ones of said communication conditions is utilized with said determined network condition is utilized with said identifying means to select said optimized network parameter; and means for communicating with a plurality of network elements so as to provide said selected network parameter to said selected ones of said plurality of network elements.

2. The system of claim 1, wherein said storing means comprises:

means for associating ones of said stored network parameters with said selected ones of said plurality of network elements, wherein said associating means is utilized with said communicating means to provide said optimized network parameter to said selected ones of said plurality of network elements.

3. The system of claim 1, wherein said storing means comprises:

means for retrievably storing a message associated with at least one of said stored network parameters, wherein said message is provided to a party to a wireless communication affected by a use of said associated stored network parameter.

4. The system of claim 1, further comprising:

means for providing a message associated with said selected network parameter to a party to a wireless communication affected by a use of said selected network parameter.

5. The system of claim 1, wherein said network condition is a preestablished time.

6. The system of claim 5, wherein said selected network parameter is optimized according to predicted network utilization associated with said time.

7. The system of claim 5, wherein said selected network parameter is optimized according to historical network utilization associated with said time.

8. The system of claim 1, wherein said network condition is a substantially real-time measurement of network utilization.

9. The system of claim 5, wherein said measurement of network utilization is a measurement of utilization of a particular network resource.

10. The system of claim 9, wherein said particular network resource is a predefined portion of said network.

11. The system of claim 9, wherein said particular network resource is a cell and said wireless communication network is a cellular communication network.

12. The system of claim 9, wherein said particular network resource is a sector of a cell and said wireless communication network is a cellular communication network.

13. The system of claim 9, wherein said particular network resource is an antenna beam.

14. The system of claim 1, wherein said network condition is a real-time monitored communication attribute.

15. The system of claim 14, wherein said monitored communication attribute is a signal to noise ratio.

16. The system of claim 14, wherein said monitored communication attribute is a measurement of interference.

17. The system of claim 14, wherein said monitored communication attribute is a position of a mobile unit operating within said wireless communication network.

18. The system of claim 14, wherein said monitored communication attribute is a signal level.

19. The system of claim 14, wherein said monitored communication attribute is a bit error rate.

20. The system of claim 14, wherein said monitored communication attribute is a frame error rate.

21. The system of claim 14, wherein said monitored communication attribute is a measurement of voice quality.

22. The system of claim 14, wherein said monitored communication attribute is a data throughput.

23. The system of claim 14, wherein said monitored communication attribute is a dropped call rate.

24. The system of claim 14, wherein said monitored communication attribute is a call origination success rate.

25. The system of claim 14, wherein said monitored communication attribute is a call termination success rate.

26. The system of claim 14, wherein said monitored communication attribute is a directional flow of communication traffic within at least a portion of said wireless communication network.

27. The system of claim 1, wherein said selected network parameter includes a network parameter selected from the group consisting of:
- a threshold value for operation of a particular aspect of at least one network element of said selected ones of said plurality of network elements;
- timing window information for operation of a particular aspect of at least one network element of said selected ones of said plurality of network elements;
- a neighbor list for operation of a particular aspect of at least one network element of said selected ones of said plurality of network elements; and
- an antenna beam list for operation of a particular aspect of at least one network element of said selected ones of said plurality of network elements.

28. The system of claim 1, wherein said selected network parameter includes a network parameter selected from the group consisting of:
- a transmit power level;
- a receive sensitivity;
- a communication threshold setting;
- a communication operating range; and
- a grade of service metric.

29. A method for dynamically providing network parameters to network elements wherein the network parameters provided are optimized with respect to particular network conditions, said method comprising the steps of:
- determining that operation of said cellular network with respect to at least one network element of said plurality of network elements is a candidate for optimization;
- selecting at least one network parameter to precipitate said optimized operation of said network with respect to said at least one network element; and
- providing said at least one selected network parameter to selected ones of said plurality of network elements, wherein said provided network parameter is accepted into an operating protocol of at least one network element of said selected ones of said plurality of network elements and thereby causes an in-service alteration of operation to said at least one network element.

30. The method of claim 29, further comprising the steps of:
- retrievably storing a plurality of network parameters optimized for various communication conditions in said network; and
- identifying ones of said stored network parameters with particular ones of said communication conditions, wherein identification with a particular communication condition is utilized by said selecting step in determining that said at least one network parameter will precipitate said optimized operation of said network.

31. The method of claim 29, further comprising the step of:
- associating ones of said stored network parameters with particular ones of said plurality of network elements, wherein said association with a particular network element is utilized by said providing step in providing said at least one selected network parameter to said at least one network element.

32. The method of claim 29, further comprising the step of:
- retrievably storing a message associated with said at least one selected network parameter, wherein said message is provided to a party to a communication affected by said alternation of operation to said at least one network element.

33. The method of claim 29, further comprising the steps of:
- monitoring said plurality of network elements, wherein said monitoring step provides information regarding a substantially real-time network condition;
- formulating at least one network parameter in response to said network condition to provide optimized network operation with respect to said substantially real-time network condition.

34. The method of claim 33, wherein said selected at least one network parameter includes said formulated at least one network parameter.

35. The method of claim 33, further comprising the step of:
- retrievably storing said formulated at least one network parameter; and
- identifying said stored formulated at least one network parameter with said substantially real-time network condition, wherein identification with said substantially real-time network condition is utilized by said selecting step in determining that said at least one network parameter will precipitate said optimized operation of said network.

36. The method of claim 35, further comprising the step of:
- associating said stored formulated at least one network parameter with particular ones of said plurality of network elements, wherein said association with a particular network element may be utilized by said providing step in providing said at least one selected network parameter to said at least one network element.

37. The method of claim 29, wherein said selecting step comprises the steps of:
- determining if a previously optimized network parameter corresponding to said optimization of said network operation with respect to said at least one network element is available;
- identifying said previously optimized network parameter for selection by said selecting step if said previously optimized network parameter is determined to be available; and
- formulating at least one said network parameter corresponding to said optimization of said network operation with respect to said at least one network element if said previously optimized network parameter is determined not to be available.

38. The method of claim 29, wherein said at least one selected network parameter is a threshold value for operation of a particular aspect of said at least one network element.

39. The method of claim 29, wherein said at least one selected network parameter is timing window information for operation of a particular aspect of said at least one network element.

40. The method of claim 29, wherein said at least one selected network parameter is a neighbor list for operation of a particular aspect of said at least one network element.

41. The method of claim 18, wherein said at least one selected network parameter is an antenna beam list for operation of a particular aspect of said at least one network element.

42. The method of claim 29, wherein said at least one selected network parameter is an antenna beam gain/attention adjustment.

43. The method of claim 29, wherein said at least one selected network parameter is an antenna structure uptilt/downtilt adjustment.

44. The method of claim 29, wherein said determining step utilizes a preestablished time in determining that operation of said network may be optimized.

45. The method of claim 44, wherein said determining step utilizes a predicted network load in determining that operation of said network may be optimized.

46. The method of claim 44, wherein said determining step utilizes a historical network load in determining that operation of said network may be optimized.

47. The method of claim 29, wherein said determining step utilizes a measurement of network utilization in determining that operation of said network may be optimized.

48. The method of claim 29, wherein said determining step utilizes a monitored communication attribute in determining that operation of said network may be optimized.

49. The method of claim 48, wherein said monitored communication attribute is selected from the group consisting of:

a signal to noise ratio;

a measurement of interference;

a position of a mobile unit operating within said network; and a directional flow of communication traffic within at least a portion of said network.

50. A system for continuously providing optimized network parameters to network elements, wherein said optimized network parameters are optimized to provide desired network behavior consonant with a prevailing condition, said system comprising:

means for interfacing with a plurality of network elements, said interfacing means including an input interface providing real-time information with respect to said prevailing condition, said interfacing means also including an output interface to ones of said plurality of network elements;

means for retrievably storing a plurality of network parameter sets optimized for various prevailing conditions;

means for retrieving a network parameter set from said stored plurality of network parameter sets, said retrieving means operable as a function of said real-time information provided by said input interface to retrieve a particular network parameter set suitable to precipitate said desired network behavior; and means operable with said interfacing means for providing at least a portion of said retrieved network parameter set to at least a first selected network element of said plurality of network elements, wherein operation of said first selected network element is adjusted to at least in part achieve said desired network behavior.

51. The system of claim 50, wherein said storing means comprises:

means for associating parameters of said stored network parameter sets with particular ones of said plurality of network elements.

52. The system of claim 51, wherein said first selected network element is selected as a function of said association with parameters of said retrieved network parameter set.

53. The system of claim 51, further comprising:

means operable with said interfacing means for providing at least a portion of said retrieved network parameter set to at least a second selected network element of said plurality of network elements, wherein said associating means is utilized with said first and second mentioned providing means to provide said parameters associated with said first selected network element to said first selected network element and to provide said parameters associated with said second selected network element to said second selected network element.

54. The system of claim 53, wherein said portion of said retrieved network parameter set provided to said first network element and said portion of said retrieved network parameter set provided to said second network element are not identical.

55. The system of claim 50, wherein ones of said stored network parameter sets include a message, wherein said message is provided to a party to a communication affected by a use of said associated stored network parameter.

56. The system of claim 50, further comprising:

means for optimizing network parameter sets in response to said prevailing condition, said optimized network parameter sets precipitating predetermined adjustment of said cellular network when at least a portion of said optimized network parameter set is provided to said first selected network element.

57. The system of claim 56, wherein said storing means comprises:

means for updating said stored a plurality of network parameter sets to include said optimized network parameter sets.

58. The system of claim 50, wherein said prevailing condition is a preestablished time.

59. The system of claim 50, wherein said prevailing condition is selected from the group consisting of:

utilization of said network;

utilization of at least one cell of said network;

utilization of at least one sector of said network; and utilization of at least one antenna beam of said network.

60. The system of claim 50, wherein said prevailing condition is a communication attribute.

61. The system of claim 60, wherein said communication attribute is selected from the group consisting of:

a signal to noise ratio within at least a portion of said network;

a carrier to interference ratio within at least a portion of said network;

an interference level within at least a portion of said network;

a receive signal strength;

a position of a mobile unit operating within said network; and a directional flow of communication traffic within at least a portion of said network.

62. A system for continuously updating communication network parameters for use by various network components, wherein said updated network parameters are optimized to provide desired network behavior consonant with a monitored network condition, said system comprising:

means for interfacing with a plurality of network components, said interfacing means including an input interface providing substantially real-time information with respect to said monitored condition, said interfacing means also including an output interface to ones of said plurality of network components;

means for retrievably storing a plurality of network parameter sets optimized for various network conditions;

means for determining if said storing means includes a previously optimized network parameter set corresponding to said monitored network condition suitable to precipitate said desired network behavior;

means for identifying said previously optimized network parameter set as a selected network parameter set if said storing means is determined to include said previously optimized network parameter set;

means for optimizing at least one said network parameter corresponding to said monitored network condition if said storing means is determined not to include said previously optimized network parameter set, said optimized network parameter being suitable to precipitate said desired network behavior, wherein said optimized network parameter is included in a selected network parameter set; and means for storing a network parameter set including said optimized network parameter with said plurality of network parameter sets;

means operable with said interfacing means for providing at least a portion of said selected network parameter set to at least a first selected network component of said plurality of network components, wherein said provided network parameter portion is accepted into an operating protocol of said first selected network component and thereby causes an in-service alteration of operation to said first selected network component.

63. The system of claim 62, wherein said provided portion of said selected network parameter set includes a network parameter selected from the group consisting of:

a threshold value for operation of a particular aspect of said first selected network component;

timing window information for operation of a particular aspect of said first selected network component;

a neighbor list for operation of a particular aspect of said first selected network component;

an antenna beam list for operation of a particular aspect of said first selected network component;

an antenna beam gain/attenuation adjustment;

an antenna beam uptilt/downtilt adjustment;

a transmit power;

a receive sensitivity; and a grade of service metric.

64. The system of claim 62, wherein said monitored network condition is selected from the group consisting of:

a signal to noise ratio within at least a portion of said communication network;

a carrier to interference ratio within at least a portion of said communication network;

an interference level within at least a portion of said communication network;

a receive signal strength;

a position of a mobile unit operating within said communication network;

a directional flow of communication traffic within at least a portion of said communication network; and a load serviced by at least a portion of said communication network.

65. The system of claim 62, further comprising:

means for associating at least one parameter of said stored network parameter sets with particular ones of said plurality of network components, wherein said associating means is utilized with said providing means to provide at least one parameter associated with said first selected network component to said first selected network component.

66. The system of claim 65, further comprising:

means operable with said interfacing means for providing at least a portion of said selected network parameter set to at least a second selected network component of said plurality of network components.

67. A system for dynamically providing wireless communication network parameters to network elements wherein the network parameters provided are optimized with respect to particular network conditions, said system comprising:

means for determining a network condition;

means for selecting a network parameter optimized with respect to said determined network condition, wherein said selecting means comprises means for optimizing said network parameters in response to said determined network condition to provide desired wireless communication network behavior with respect to said determined network condition and means for retrievable storing a plurality of said optimized network parameters for various corresponding network conditions; and means for communicating with a plurality of network elements so as to provide said selected network parameter to said selected ones of said plurality of network elements.

68. The system of claim 67, wherein said selecting means further comprises:

means for determining if previously optimized network parameters corresponding to said determined network condition are stored in said storing means;

means for temporarily disabling said optimizing means with respect to said determined network condition if said previously optimized network parameters are determined to correspond to said determined network condition;

means for retrieving said stored optimized network parameters for provision to said network elements by said providing means if said previously optimized network parameters are determined to correspond to said determined network condition; and means for updating said previously stored optimizing network parameters to include said network parameters optimized in response to said determined network condition if said previously optimized network parameters are determined not to correspond to said determined network condition.

* * * * *